Jan. 2, 1945.  W. F. BOLDT  2,366,173
BRAKING SYSTEM CONTROL MEANS
Filed June 27, 1942  2 Sheets-Sheet 1
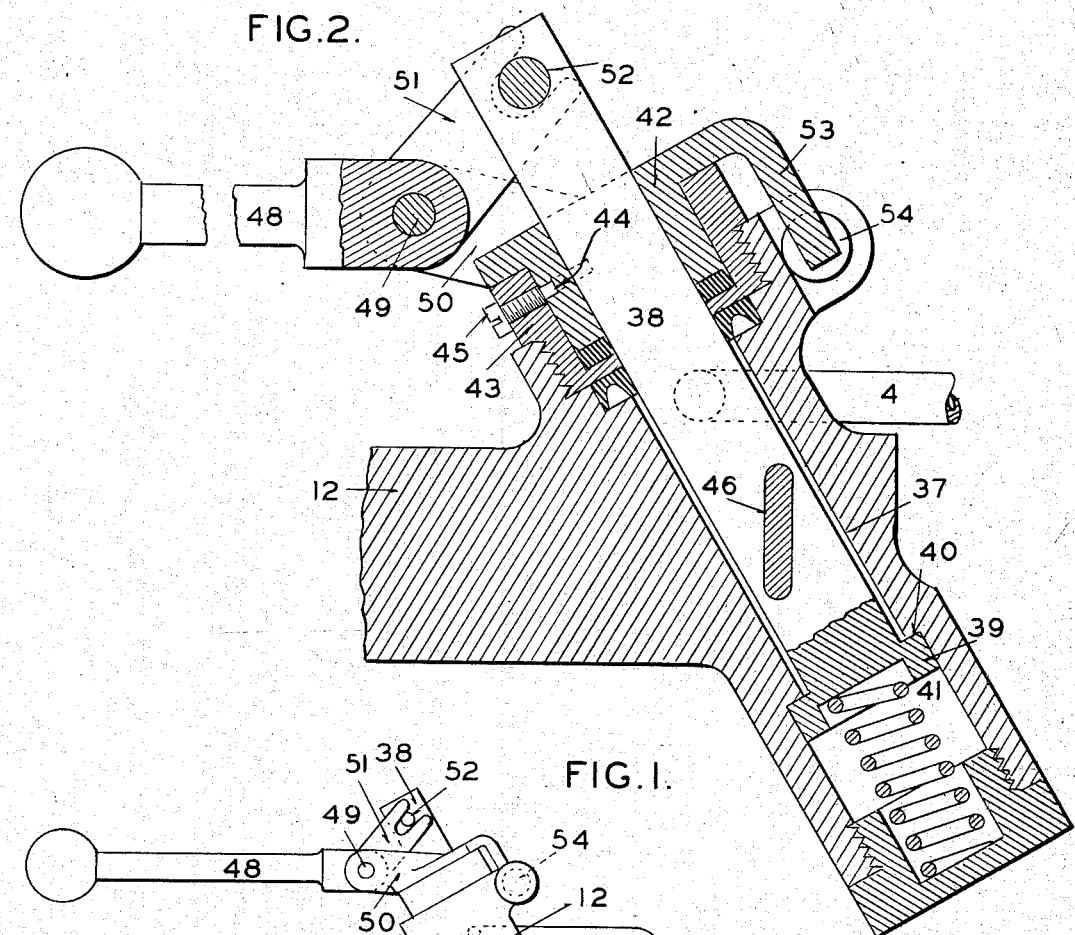
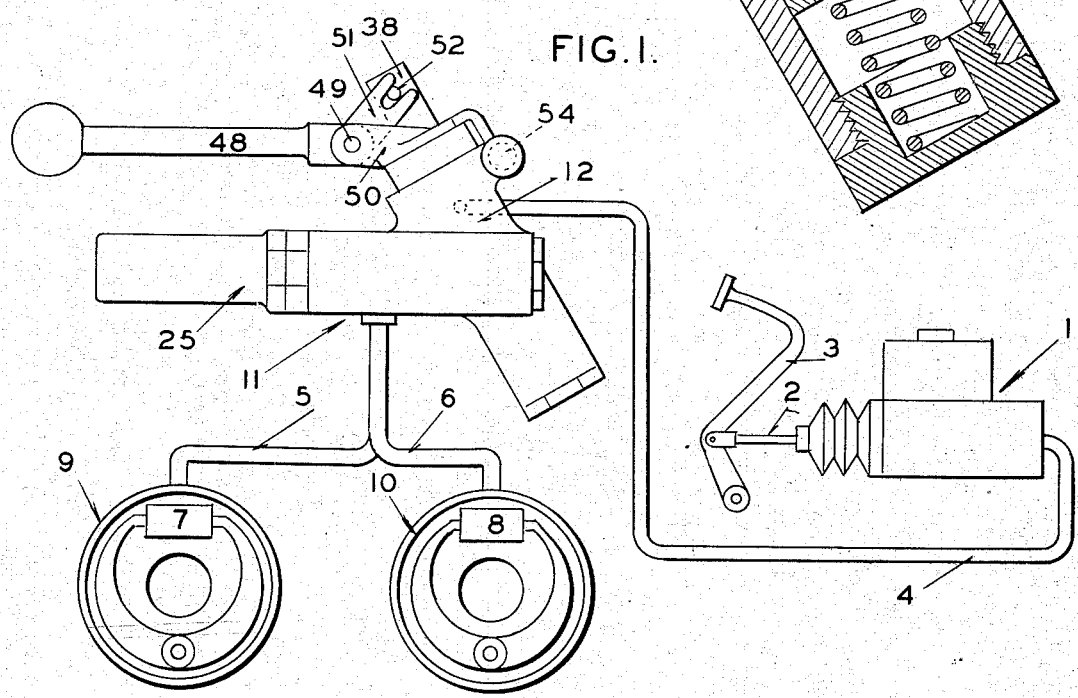
INVENTOR
W. F. BOLDT
BY
ATTORNEY Jan. 2, 1945.  W. F. BOLDT  2,366,173
BRAKING SYSTEM CONTROL MEANS
Filed June 27, 1942  2 Sheets-Sheet 2
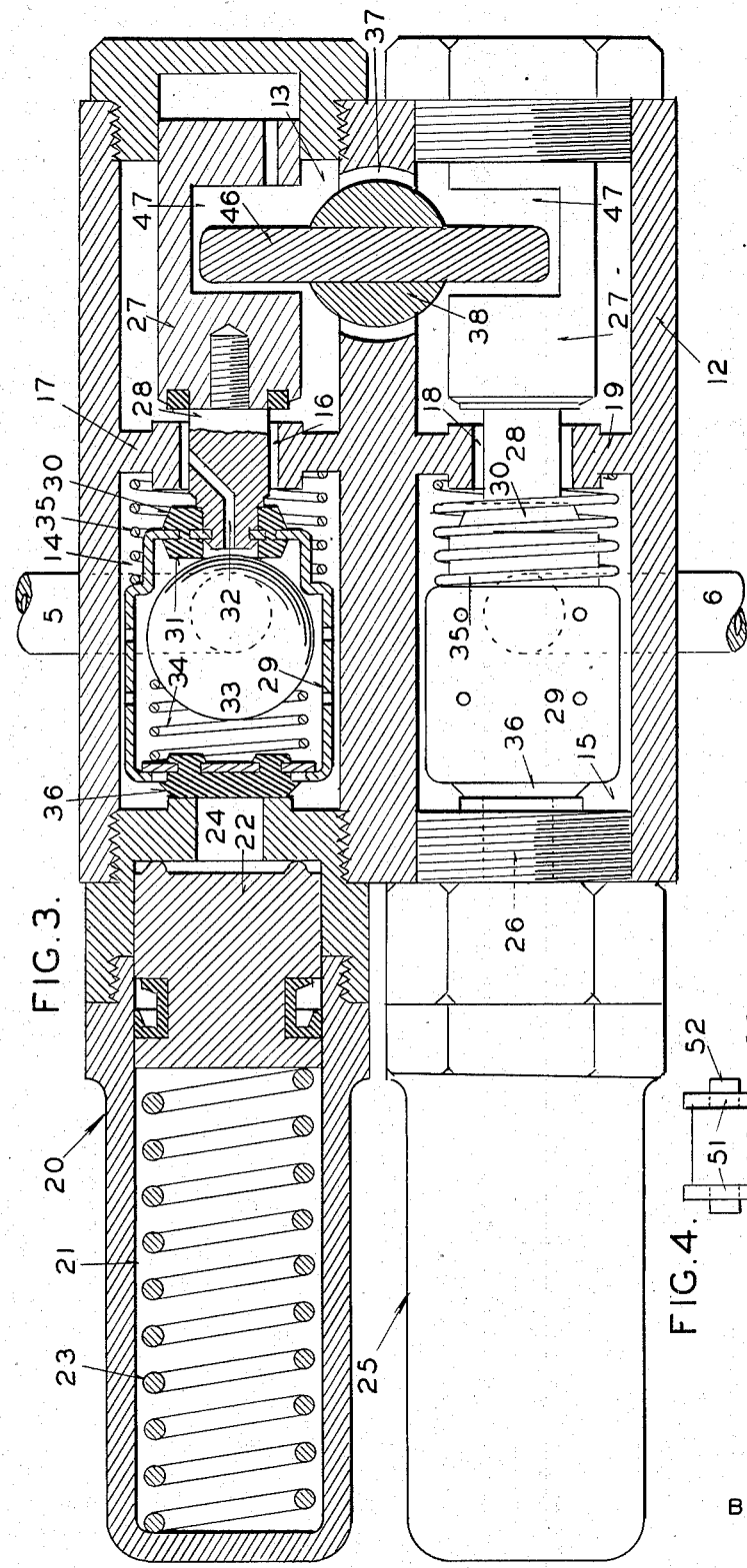
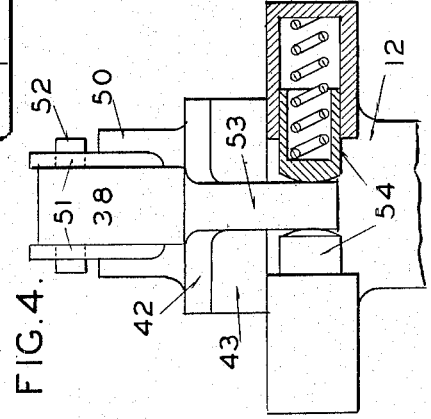
INVENTOR
W. F. BOLDT
BY
ATTORNEY Patented Jan. 2, 1945

2,366,173

UNITED STATES PATENT OFFICE 2,366,173

BRAKING SYSTEM CONTROL MEANS

Werner F. Boldt, Clayton, Mo., assignor to Wagner Electric Corporation, St. Louis, Mo., a corporation of Delaware Application June 27, 1942, Serial No. 448,765

11 Claims. (Cl. 188—152)

My invention relates to fluid pressure systems and more particularly to one for controlling the brakes of a vehicle.

One of the objects of my invention is to provide an improved braking system for a vehicle which will permit the operator to so employ the brakes that they can be an aid to steering.

Another object of my invention is to provide improved control valve means for a fluid pressure system which will permit the operator to manually select, when desired, certain devices to be actuated by said system.

Yet another object of my invention is to so associate fluid pressure accumulator means with the type of fluid pressure system referred to that the control valve means can be employed to trap fluid in the system and at the same time connect the accumulator means with the portion of the system in which the fluid is to be trapped.

Other objects of my invention will become apparent from the following description taken in connection with the accompanying drawings in which Figure 1 is a schematic view of a brake controlling fluid pressure system embodying my invention; Figure 2 is a vertical sectional view of a part of the control valve; Figure 3 is a horizontal sectional view showing the accumulator means and the manner in which said means is controlled; and Figure 4 is a view of the shaft centering means.

Referring in detail to the drawings and first to Figure 1, there is disclosed a fluid pressure system for operating brakes in which the source of pressure is a master cylinder device 1 of known construction, the piston thereof (not shown) being actuated by a rod 2 and a pedal 3. The outlet of this master cylinder communicates with a conduit 4 to supply fluid to branch conduits 5 and 6, the former leading to a fluid motor 7 and the latter to a fluid motor 8. These fluid motors can be employed to actuate any device desired but, as shown, fluid motor 7 operates brake 9 on the left wheel of the vehicle and fluid motor 8 operates brake 10 on the right wheel of the vehicle. Interposed between conduit 4 and branch conduits 5 and 6 is my improved valve mechanism generally indicated by the numeral 11 whereby the operation of the fluid motors can be selectively controlled so that either the right or left wheel can be braked and thus aid in steering the vehicle, especially in making short turns. The valve mechanism is also so constructed that fluid pressure can be trapped in the fluid motors and maintained under pressure to thus hold the brakes applied and enable the operator to use the braking system for parking purposes to prevent the vehicle from rolling when it is standing.

Referring now to Figures 2, 3, and 4, the details of my novel valve mechanism will be described. A casing 12 is provided with a forward chamber 13 and two rearward chambers 14 and 15. The forward chamber 13 is connected with conduit 4 leading from the master cylinder device whereas chamber 14 is connected to conduit 5 leading to the left wheel brake and chamber 15 is connected to conduit 6 leading to the right wheel brake. The chamber 13 communicates with chamber 14 by way of a passage 16 in the separating wall 17 and with chamber 15 by way of passage 18 in the separating wall 19.

Chamber 14 has a fluid pressure accumulator 20 associated therewith. This accumulator comprises a cylinder 21 in which is a piston 22 backed by a strong spring 23. The cylinder communicates with chamber 14 by way of a passage 24. Chamber 15 also has associated therewith a fluid pressure accumulator 25 of the same construction as accumulator 20 which is connected with chamber 15 by a passage 26.

Communication through passage 16 from chamber 13 to chamber 14 is adapted to be cut off by a valve element 27 which has a stem 28 extending through the passage and attached to a perforated cage 29 positioned in chamber 14. The forward end of this cage carries opposed valve elements 30 and 31 surrounding the stem through which extends a passage 32 in said stem. The valve element 30 is adapted to engage the wall 17 and so close off passage 16 that fluid must pass through passage 32 of the stem. A ball 33 is carried by the cage and cooperates with the other valve element 31 to provide a check valve preventing flow of fluid from chamber 14 to chamber 13. This ball is biased into engagement with valve element 31 by a spring 34 which is interposed between the ball and the rear end of the cage. Another spring 35 normally biases the cage to a position where the valve element 30 is unseated, the valve element 27 on stem 28 remaining in an unseated position under these conditions. At the rear end of this cage there is provided a valve element 36 for controlling passage 24 leading to the accumulator, said valve element being positioned between a flange on the rear end of the cage and the spring 34 which acts on the ball. This valve element is normally held seated by the action of spring 35 and when seated acts as a stop to determine the normal position of the cage as spring 34 is slightly stronger than spring 35.

Passage 18 between chambers 13 and 15 and passage 26 between the latter chamber and the accumulator 25 are controlled by valve structure identical with that previously described with respect to passage 16 between chambers 13 and 14 and passage 24 between the latter chamber and accumulator 20. Similar parts are designated by the same numerals.

The casing 12 is provided with a bore 37 which extends through the central part of chamber 13 between valve elements 27 and at an angle to the axes of said elements. Mounted in this bore is a shaft 38 capable of both rotative and longitudinal movement. This shaft is slightly smaller in diameter than the bore in order that fluid from conduit 4 may pass to chamber 13. The lower end of the shaft is provided with a flange 39 which is held in abutment with a shoulder 40 of the bore by a spring 41 acting on the lower end of the shaft. The shaft projects to the upper exterior of the casing and has bearing in a sleeve 42 which is rotatably mounted in a hollow nut 43. The sleeve is provided with a groove 44 which receives the end of a screw 45 carried by the nut to thus hold the sleeve in position.

The central part of the shaft carries a cross-arm 46, each end of which projects into an oversized slot 47 in a valve element 27 in order that these valve elements may be controlled by the shaft. If the shaft is given a clockwise rotation, as viewed in Figure 3, the valve element 27 associated with passage 18 will be closed to thus prevent communication from chamber 13 to chamber 15. If the shaft should be given a counter-clockwise rotation, as viewed in Figure 3, then valve element 27 associated with passage 16 will be closed to thus prevent communication from chamber 13 to chamber 14. When one valve element 27 is seated, the other valve element 27 will not be moved due to the over-size slot arrangement.

The cross-arm 46, which is of considerable width, is positioned in the shaft so that the plane in which it lies is at an angle to the axis of the shaft and substantially at right angles to the axes of the valve elements 27. Thus because of this relationship, it is seen that if the shaft should be moved downwardly, the cross-arm will be moved forwardly with respect to the valve elements 27. The opposite ends of the cross-arms will engage the forward sides of the slots and move both valve elements 27 to the right, as viewed in Figure 3. This movement of the valve elements will cause seating of the valve elements 30 carried by the cage and at the same time cause unseating of the valve elements 36 which control the passages 24 and 26 leading to the two accumulators. The check valves for the passages 16 and 18 will now become operative so that fluid in chambers 14 and 15 and the fluid motors cannot return to chamber 13 and the master cylinder device. If fluid under pressure should now be forced into chambers 14 and 15 by operation of the master cylinder device, the brakes will be applied and so held. By successive operations of the master cylinder device, additional fluid under pressure can be forced by the check valves, which fluid will cause the pistons of accumulators 20 and 25 to be forced rearwardly against their springs. With the accumulators in operation, a decrease in volume of fluid, due to the changes in temperature, will not release the pressure of the trapped fluid due to the action of the accumulator springs. Since there is an accumulator for each brake fluid motor both accumulators must fail before all the brakes become released.

The shaft 38 is controlled by a handle 48 which is pivoted by a pin 49 on arms 50 of sleeve 42. The handle is provided with forked arms 51 which engage with a cross-pin 52 in the end of the shaft. Thus by means of this construction the shaft can be rotated in opposite directions by swinging the handle in a horizontal plane. When it is desired to move the shaft downwardly, this is done by merely pulling up on the outer end of the handle. The downward movement of the shaft compresses the spring 41 at the bottom of the shaft and thus when the handle is released, the shaft will again be returned to its position as determined by shoulder 40. In order that the shaft may be biased to a neutral position, as regards its rotative movement, sleeve 42 is provided with a downwardly extending finger 53 extending between two spring-pressed plungers 54 carried by the casing 12. When the shaft is in this neutral position, the cross-arm 46 will be as shown in Figure 3 and under these conditions the valve elements which control passages 16 and 17 will be open and the accumulators will be shut off as shown.

Referring now to the operation, when the parts are in their inoperative positions shown in Figures 2, 3, and 4, there will be free two-way communication between the master cylinder device and each fluid motor. Thus both brakes can be simultaneously applied and released at will. If it should be desired to prevent the operation of the left brake, this can be accomplished by merely rotating the handle in a counter-clockwise direction, that is, to the right. This will cause the closing of passage 16, thus preventing the left wheel brake from being applied. When the master cylinder device is now operated, only the right wheel brakes will be applied. If the operator is making a short right hand turn with the vehicle, this feature of being able to apply only the right wheel brake will be a considerable aid in making the short turn since with the right wheel being braked the vehicle can pivot about this wheel. In a like manner if it is desired to prevent the application of the right wheel brake, such can be done by turning the handle in a clockwise direction, that is, to the left, as viewed from the top. This will cut off the fluid motor of the right wheel brake and when the master cylinder device is operated, only the left wheel brake will be applied.

If it is desired to use the braking system for parking purposes, this can be accomplished by merely pulling up on the handle and then pumping the master cylinder device until sufficient fluid under pressure is admitted to both brakes so that the accumulator piston will be moved rearwardly against its spring. The pulling up on the handle causes both check valve means to be operative to prevent return flow of fluid from chambers 14 and 15 to chamber 13 and at the same time connects the accumulators with their respective fluid motors. Release of the handle after release of the master cylinder device will not release the brakes as the trapped fluid under pressure will hold valve elements 30 of the cages in a seated condition. To release the brakes, the master cylinder is operated to develop the same pressure as the trapped fluid at which time springs 35 will move the cages to the left and unseat valve elements 30.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a source of pressure, two fluid motors, means for connecting the source to the motors including a conduit leading to each motor, a normally open shut-off valve for each conduit including a reciprocable element, a rotatable and slidable shaft extending transversely to and between the axes of the valve elements, means carried by the shaft for engaging and closing one valve element when the shaft is rotated in one direction from a predetermined position and for engaging and closing the other valve element when the shaft is rotated in the opposite direction from said predetermined position, a fluid pressure accumulator associated with each motor, and means operable by a sliding movement of the shaft to simultaneously trap fluid under pressure in each motor and to place each accumulator in communication with the motor with which it is associated.

2. In a fluid pressure system, a source of pressure, two fluid motors, means for connecting the source to the motors including a conduit leading to each motor, a normally open shut-off valve for each conduit including a reciprocable element, a rotatable and slidable shaft extending transversely to and between the axes of the valve elements, means carried by the shaft for engaging and closing one valve element when the shaft is rotated in one direction from a predetermined position and for engaging and closing the other valve element when the shaft is rotated in the opposite direction from said predetermined position, a fluid pressure accumulator associated with each motor, means operable by a sliding movement of the shaft to simultaneously trap fluid under pressure in each motor and to place each accumulator in communication with the motor with which it is associated, and means for rotating and sliding the shaft by a single handle movable in different planes.

3. In a fluid pressure system, a source of pressure, two fluid motors, means for connecting the source to the motors including a conduit leading to each motor, a normally open shut-off valve for each conduit including a reciprocable element, said elements being positioned with their axes in parallel relation, a rotatable and axially slidable shaft extending between the elements with its axis transverse to the axes of the valve elements, means carried by the shaft for engaging and closing one valve element when the shaft is rotated in one direction from a predetermined position and for engaging and closing the other valve element when the shaft is rotated in the opposite direction from said predetermined position, check valve means associated with each conduit for preventing flow of fluid from the motor to the source, means for causing each check valve means to be operative by movement of a shut-off valve element in an unseating direction, and means for moving both valve elements of the shut-off valves simultaneously by a slidable movement of the shaft.

4. In a fluid pressure system, a source of pressure, two fluid motors, means for connecting the source to the motors including a conduit leading to each motor, a normally open shut-off valve for each conduit including a reciprocable element, said elements being positioned with their axes in parallel relation, a rotatable and axially slidable shaft extending between the elements with its axis transverse to the axes of the valve elements, a cross-bar carried by the shaft for engaging and closing one valve element when the shaft is rotated in one direction from a predetermined position and for engaging and closing the other valve element when the shaft is rotated in the opposite direction from said predetermined position, check valve means associated with each conduit for preventing flow of fluid from the motor to the source, means for causing each check valve means to be operative by movement of a shut-off valve element in an unseating direction, and means for engaging and moving both valve elements of the shut-off valves simultaneously in the unseating direction by the ends of the cross-bar when the shaft is moved axially.

5. In a fluid pressure system having a source of pressure connected to two fluid motors by separate conduits, valve means for controlling the flow of fluid from the source to the motors and for trapping fluid pressure in the motors, said valve means comprising a chamber connected to the source, two other chambers each connected to a conduit and both communicating with the first chamber by separate passages, a shut-off valve for each passage for preventing flow of fluid from the first chamber to the other chambers, check valve means for each passage comprising an element connected to the movable element of the shut-off valve of each passage so as to be controlled thereby, a rotatable and slidable shaft positioned in the first chamber and extending between the movable elements of the shut-off valves, means for selectively closing the elements of the shut-off valves by rotation of the shaft in opposite directions from a predetermined position, and means for simultaneously moving the shut-off valve elements by an axial movement of the shaft to thereby cause both check valves to be operative to trap fluid in both motors.

6. In a fluid pressure system having a source of pressure connected to two fluid motors by separate conduits, valve means for controlling the flow of fluid from the source to the motors and for trapping fluid pressure in the motors, said valve means comprising a chamber connected to the source, two other chambers each connected to a conduit and both communicating with the first chamber by separate passages, a shut-off valve for each passage for preventing flow of fluid from the first chamber to the other chambers, check valve means for each passage positioned in each of said two other chambers and comprising a passage closing element having a passage therethrough and connected to the movable element of the shut-off valve of each passage so as to be controlled thereby and a check valve for the passage through the element, a rotatable and slidable shaft positioned in the first chamber and extending transversely between the movable elements of the shut-off valves, means for selectively closing the elements of the shut-off valves by rotation of the shaft in opposite directions from a predetermined position, and means for simultaneously moving the shut-off valve elements by an axial movement of the shaft to thereby cause both check valves to be operative to trap fluid in both motors.

7. In a fluid pressure system, a source of pressure, two fluid motors, means for connecting the source to the motors including a conduit leading to each motor, a normally open shut-off valve for each conduit including a reciprocable element, said elements being positioned with their axes in parallel relation, a rotatable and axially slidable shaft extending between the elements with its axis transverse to the axes of the valve elements, means for closing one valve element when the shaft is rotated in one direction from a predetermined position and for engaging and closing the other valve element when the shaft is rotated in the opposite direction from said predetermined position, check valve means associated with each conduit for preventing flow of fluid from the motor to the source, a fluid pressure accumulator associated with each motor, normally closed valve means for preventing each accumulator from communicating with the fluid motor with which it is associated, means for causing the check valve means to be operative and the accumulator valves to be opened by movement of the shut-off valve elements in an unseating direction, and means for moving both valve elements of the shut-off valves simultaneously in an unseating direction by a slidable movement of the shaft.

8. In a fluid pressure system, a source of pressure, two fluid motors, means for connecting the source to the motors including a conduit leading to each motor, a normally open shut-off valve for each conduit including a reciprocable element, said elements being positioned with their axes in parallel relation, a rotatable and axially slidable shaft extending between the elements with its axis transverse to the axes of the valve elements, means for closing one valve element when the shaft is rotated in one direction from a predetermined position and for engaging and closing the other valve element when the shaft is rotated in the opposite direction from said predetermined position, check valve means associated with each conduit for preventing flow of fluid from the motor to the source, a fluid pressure accumulator associated with each motor, normally closed valve means for preventing each accumulator from communicating with the fluid motor with which it is associated, means for causing the check valve means to be operative and the accumulator valves to be opened by movement of the shut-off valve elements in an unseating direction, means for moving both valve elements of the shut-off valves simultaneously in an unseating direction by a slidable movement of the shaft, a member mounted for rotation about the shaft axis, a handle pivoted to the member and connected to the shaft to rotate the same by a movement of the handle and member in a plane normal to the shaft axis and to reciprocate the shaft by a pivotal movement of the lever on the member.

9. In a fluid pressure system, a source of pressure, two fluid motors, means for connecting the source to the motors including a conduit leading to each motor, a normally open shut-off valve for each conduit including a reciprocable element, a rotatable and axially shiftable shaft extending transversely to and between the axes of the valve elements, means carried by the shaft for engaging and closing one valve element when the shaft is rotated in one direction from a predetermined position corresponding to the normal open condition of both shut-off valves and for engaging and closing the other valve element when the shaft is rotated in the opposite direction from said predetermined position, and means operable by an axial movement of the shaft for causing both conduits to be closed in order to cause fluid under pressure to be trapped in both fluid motors.

10. In a fluid pressure system, a source of pressure, two fluid motors, means for connecting the source to the motors including a conduit leading to each motor, a normally open shut-off valve for each conduit including a reciprocable element, a rotatable and axially shiftable shaft extending transversely to and between the axes of the valve elements, a cross-bar carried by the shaft, means for causing one end of the cross-bar to engage and close one valve element when the shaft is rotated in one direction from a predetermined position corresponding to the normal open condition of both shut-off valves and for causing the other end of the cross-bar to engage and close the other valve element when the shaft is rotated in the opposite direction from said predetermined position, and means operable by the cross-bar when the shaft is moved axially for causing any fluid under pressure in both fluid motors to be trapped therein.

11. In a fluid pressure system, a source of pressure, two fluid motors, a casing, means for connecting the source to the motors including a conduit leading through the casing to each motor and through which fluid flows to operate the motor, a normally open shut-off valve means for each conduit including two reciprocable elements and a valve stem positioned in the casing each of said elements disposed adjacent each other in individual housing bores, a rotatable shaft journaled in the casing and extending transversely to and between the axis of the valve elements and stems, and means carried by the shaft for directly engaging one of said valve stems and closing the valve element associated therewith when the shaft is rotated in one direction from a predetermined position corresponding to the normal open condition of both shut-off valves and for directly engaging the other valve stem and closing the valve element associated therewith when the shaft is rotated in the opposite direction from said predetermined position.

WERNER F. BOLDT.